No. 698,299. Patented Apr. 22, 1902.
G. S. LOWELL.
WINDMILL.
(Application filed Feb. 5, 1902.)
(No Model.) 2 Sheets—Sheet 1.
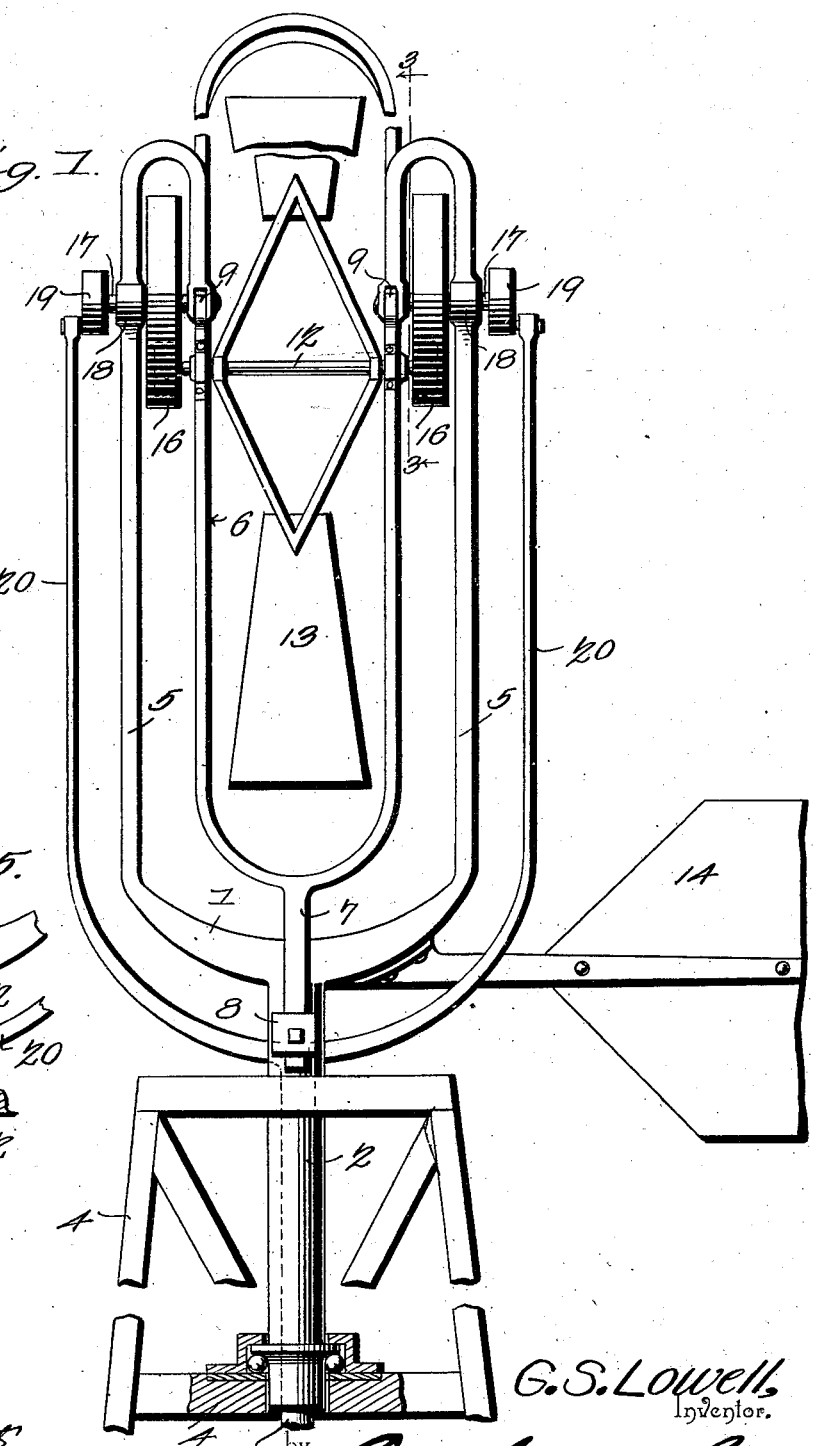

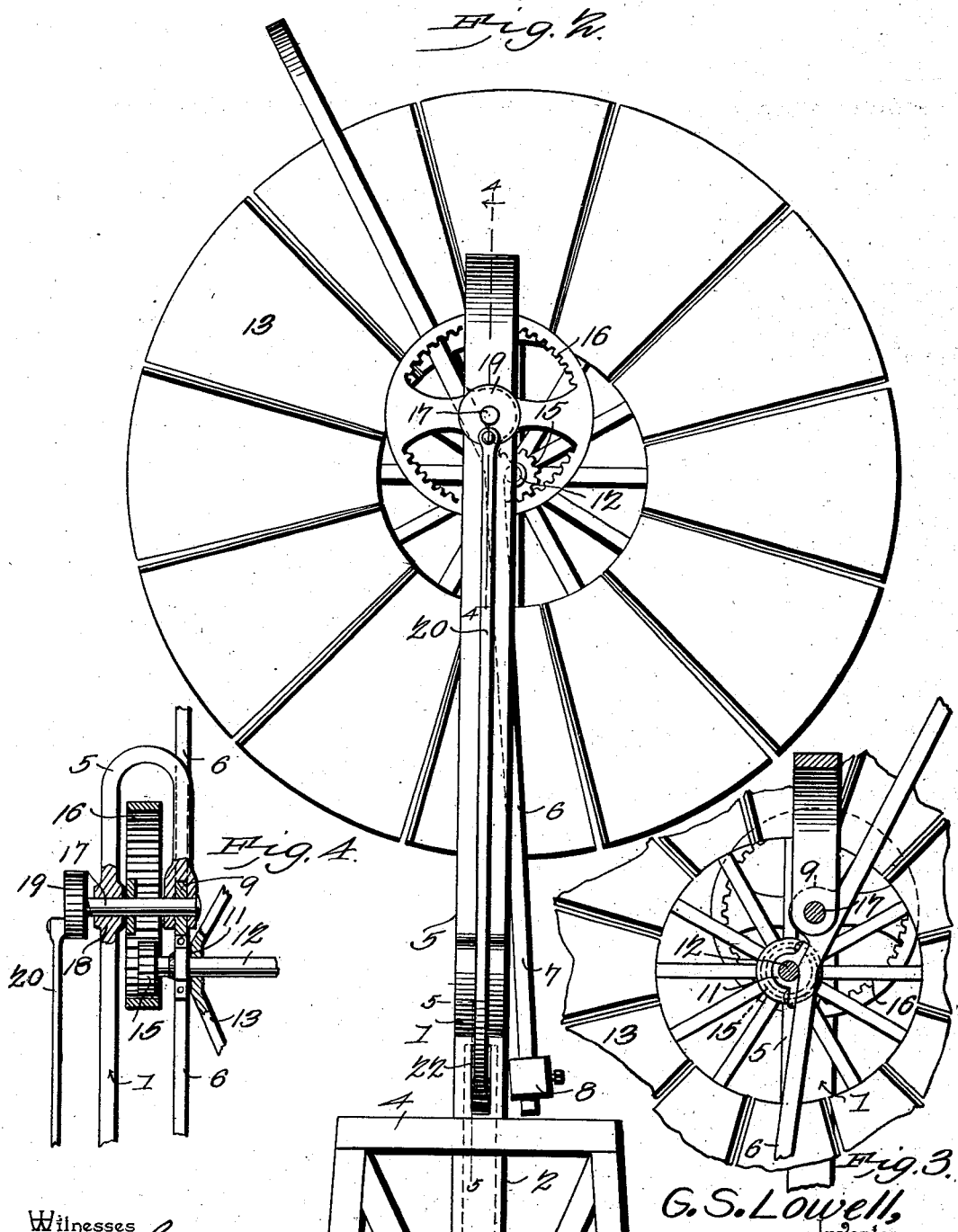

UNITED STATES PATENT OFFICE.

GRANT S. LOWELL, OF SALINA, KANSAS.

WINDMILL.

SPECIFICATION forming part of Letters Patent No. 698,299, dated April 22, 1902.

Application filed February 5, 1902. Serial No. 92,694. (No model.)

*To all whom it may concern:*

Be it known that I, GRANT S. LOWELL, a citizen of the United States, residing at Salina, in the county of Saline and State of Kansas, have invented a new and useful Windmill, of which the following is a specification.

The invention relates to improvements in windmills.

The object of the present invention is to improve the construction of windmills and to provide a simple and comparatively inexpensive one of great strength and durability in which the wind-wheel will be hung in the center of the windmill and which will afford yielding means for transmitting the power of the wind-wheel to a pump-rod.

The invention consists in the construction and novel combination and arrangement of parts hereinafter fully described, illustrated in the accompanying drawings, and pointed out in the claims hereto appended.

In the drawings, Figure 1 is a side elevation of a windmill constructed in accordance with this invention. Fig. 2 is a front elevation of the same. Fig. 3 is a detail sectional view on the line 3 3 of Fig. 1. Figs. 4 and 5 are detail sectional views on the line 4 4 and 5 5 of Fig. 2.

Like numerals of reference designate corresponding parts in all the figures of the drawings.

1 designates a rotary frame consisting of an approximately U-shaped body portion and a depending tubular stem 2, which is journaled in suitable bearings of a tower 4, and the said bearings are preferably provided with balls or other antifriction devices, as clearly shown in Fig. 1 of the drawings. The sides of the U-shaped body portion of the rotary frame have their upper portions bent inward and downward to provide a pair of depending arms 5, having their lower ends bifurcated for the reception of an oscillatory wind-wheel-carrying frame 6. The wind-wheel-carrying frame 6 is approximately elliptical, being provided with parallel sides and rounded ends, as clearly shown in Fig. 1, and it has an arm or shank 7 at its lower end for the reception of an adjustable weight 8 for the purpose hereinafter described. The oscillatory frame, which is angularly bent to arrange its upper portion at an inclination when its lower portion is substantially vertical, as shown in Fig. 2, is provided with upper bearing-openings 9 for the reception of the pivots for connecting the sides of the frame to the depending arms, and the said oscillatory frame is also provided at points below the upper bearings with lower bearing-openings 11 to receive the wind-wheel shaft 12, upon which the wind-wheel 13 is mounted. The wind-wheel 13, which may be of any desired construction, faces the wind and is held in the wind by a vane 14, secured to one side of the rotary frame, at the bottom thereof, as clearly shown in Fig. 1.

The wind-wheel shaft 12 is extended beyond the sides of the elliptical wind-wheel-receiving frame and has keyed or otherwise secured to it a pair of pinions 15, which are arranged within and mesh with internal gears 16, located within the spaces between the depending arms and the sides of the frame and mounted on short shafts 17. The short shafts 17, which may form the pivots for the oscillatory frame, are journaled in suitable bearings 18 of the sides of the U-shaped frame and extend inward and outward therefrom, being provided at their outer ends with eccentric connections 19 for communicating motion to a vertically-reciprocating frame 20. The pinions are arranged within the internal gears and are normally held at points near the bottom of the same, as illustrated in Fig. 2 of the accompanying drawings, by the weight of the wind-wheel, which is located at one side of the pivotal point of the oscillatory frame; but when the force of the wind increases and the rotation of the wind-wheel is correspondingly increased this increased velocity of the wind-wheel will cause the pinions to move upward and partially revolve around the pivot of the oscillatory frame. This partial revolution of the pinions within the internal gear will cause an upward movement of the lower arm or portion of the oscillatory frame and a consequent lifting of the wind-wheel. The weight 8, which is adjustably secured to the shank or arm 7 by a clamping-screw 21, is adapted to be moved inward and outward to accommodate the windmill to the weight of a pump-rod, and by moving the weight downward and outward on the shank or arm 7 a greater velocity or force of the wind will be required to lift the lower arm of the oscillatory frame, and when the weight is arranged adjacent to the inner end of the arm or shank. Any other form of gearing may be employed; but the internal gears are preferable, for the reason that the arrangement of the pinions within them practically relieves the pivots of the oscillatory frame of strain, and the gearing of the windmill is balanced at opposite sides and evenly supported and is held against any lateral or twisting movement.

The eccentric connection 19 preferably consists of a disk having a wrist-pin, and the oscillatory frame 20, which is approximately U-shaped, consists of a pair of upwardly-extending arms connected at their upper ends to the wrist-pins and extending through slots 22 of the tubular stem of the rotary frame and connected with a rod 23. The rod 23 is suitably connected with a pump-rod, and when the windmill is operated the pump-rod will be vertically reciprocated; but motion may be communicated to any other apparatus or device, as will be readily understood.

The weight will not have to be arranged as close to the outer end of the shank or arm of the oscillatory frame when the windmill is connected to a short light pump-rod as it will when it is connected to a long and heavy pump-rod, and it will be apparent that the parts may be readily adjusted to enable the windmill to operate smoothly pump-rods of different lengths.

What I claim is—

1. In a windmill, the combination of a rotary frame, an oscillatory frame mounted on the rotary frame, a wind-wheel eccentrically mounted on the oscillatory frame, whereby its weight will resist any oscillatory movement of the same, and gearing mounted on the said frames for communicating motion from the wind-wheel, one of the gears being arranged to partially revolve around the other, substantially as and for the purpose described.

2. In a windmill, the combination of a main frame, an oscillatory frame mounted on the main frame, a wind-wheel eccentrically mounted on the oscillatory frame, a gear mounted on the main frame, and a pinion connected with the wind-wheel and carried by the oscillatory frame and meshing with the said gear and adapted also to revolve partially around the same, whereby the oscillatory frame will be swung upward and caused to lift the wind-wheel, substantially as described.

3. In a windmill, the combination of a main frame, an oscillatory frame mounted on the main frame, a wind-wheel arranged eccentrically on the oscillatory frame, gears mounted on the said frames, the gear of the oscillatory frame being arranged to partially revolve around the other gear, whereby the oscillatory frame will be actuated to lift the wind-wheel, and an adjustable weight carried by the oscillatory frame, substantially as and for the purpose described.

4. In a windmill, the combination of a main frame, an oscillatory frame of approximately elliptical shape mounted on the main frame and arranged normally in an upright position and provided with an adjustable weight, a wind-wheel eccentrically mounted on the oscillatory frame and arranged below the pivotal point thereof, and gearing connected with the said frame, one of the gears being arranged to revolve partially around the other, substantially as described.

5. In a windmill, the combination of a rotary frame having arms at opposite sides, an oscillatory frame pivotally connected to the said arms and supported by the same, a wind-wheel eccentrically mounted on the oscillatory frame, and gears arranged between the said frames and mounted on the same for communicating motion from the wind-wheel to the device to be operated, one of the gears being arranged to revolve partially around the other, substantially as described.

6. In a windmill, the combination of a frame, an oscillatory frame mounted on the said main frame, a wind-wheel carried by the oscillatory frame and arranged eccentrically of the same, pinions located at opposite sides of the oscillatory frame and connected with the wind-wheel, and internal gears mounted on the main frame and supporting and receiving the pinions, the latter being adapted to revolve partially around the internal gears, substantially as described.

7. In a windmill, the combination of an approximately U-shaped main frame having its sides provided with inner depending arms, an oscillatory frame pivotally connected with the arms and arranged in an upright position, a wind-wheel mounted on the lower portion of the oscillatory frame, short shafts journaled on the sides of the main frame, pinions connected with the wind-wheel and located between the frames, internal gears mounted on the short shafts and receiving the pinions, and eccentric devices arranged at the outer ends of the short shafts, substantially as described.

8. In a windmill, the combination of a rotary frame, having a U-shaped upper portion and provided with a slotted stem, an oscillatory frame arranged within the rotary frame, a wind-wheel eccentrically mounted on the oscillatory frame, short shafts mounted on the rotary frame at opposite sides thereof, gearing connecting the short shafts with the wind-wheel, the approximately U-shaped vertically-reciprocating frame extending through the slotted stem and designed to be connected with a pump-rod, and eccentric connections between the sides of the reciprocating frame and the short shafts, substantially as described.

In testimony that I claim the foregoing as my own I have hereto affixed my signature in the presence of two witnesses.

GRANT S. LOWELL.

Witnesses:
W. T. WELCH,
FRED H. QUINCY.